United States Patent
Miura et al.

(10) Patent No.: US 9,522,803 B2
(45) Date of Patent: Dec. 20, 2016

(54) METHOD FOR CONNECTING REINFORCING FIBER BUNDLES, METHOD FOR PRODUCING LONG FIBER REINFORCED THERMOPLASTIC RESIN PELLET, AND WOUND BODY

(75) Inventors: Hodaka Miura, Kobe (JP); Kazuya Takamura, Kobe (JP); Takayasu Fujiura, Kobe (JP); Naoyuki Tashiro, Takasago (JP); Seiji Zenke, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 1013 days.

(21) Appl. No.: 13/391,565

(22) PCT Filed: Nov. 5, 2010

(86) PCT No.: PCT/JP2010/069750
§ 371 (c)(1),
(2), (4) Date: Feb. 21, 2012

(87) PCT Pub. No.: WO2011/055800
PCT Pub. Date: May 12, 2011

(65) Prior Publication Data
US 2012/0148838 A1    Jun. 14, 2012

(30) Foreign Application Priority Data
Nov. 6, 2009    (JP) ................. 2009-255045

(51) Int. Cl.
*B65H 69/06* (2006.01)
*B29B 9/14* (2006.01)
(Continued)

(52) U.S. Cl.
CPC .............. *B65H 69/063* (2013.01); *B29B 9/14* (2013.01); *B29B 15/122* (2013.01);
(Continued)

(58) Field of Classification Search
CPC ....... D07B 7/18; B65H 69/061; B65H 69/063; B65H 69/066
(Continued)

(56) References Cited

U.S. PATENT DOCUMENTS 3,070,947 A * 1/1963 De Toledo et al. ............... 57/22
3,831,363 A * 8/1974 Pike ....................... D02G 1/161
28/254

(Continued)

FOREIGN PATENT DOCUMENTS

CN    1478647 A    3/2004
DE    28 16 463 A1    10/1979
(Continued)

OTHER PUBLICATIONS

Office Action issued from the European Patent Office in corresponding European Application No. 10 828 359.9, dated Oct. 4, 2013, pp. 1-7.
(Continued)

Primary Examiner — Shaun R Hurley
(74) Attorney, Agent, or Firm — Studebaker & Brackett PC

(57) ABSTRACT

A method for connecting a tail end portion of a reinforcing fiber bundle of a preceding wound body to a front end portion of a reinforcing fiber bundle unwound from a new wound body by blowing pressurized air to both of the ends to unravel and entwine both of the reinforcing fiber bundles, wherein the method includes a preparation step for adjusting the amount of a sizing agent contained in the front end of the reinforcing fiber bundle unwound from the new wound body and the tail end of the preceding wound body to 4 wt % or less, and the reinforcing fiber bundles are connected after the preparation step.

1 Claim, 2 Drawing Sheets

(51) Int. Cl.
*B29B 15/12* (2006.01)
*D07B 7/18* (2006.01)
*B29C 65/00* (2006.01)
*B29C 65/48* (2006.01)

(52) U.S. Cl.
CPC .......... *B65H 69/066* (2013.01); *D07B 7/169* (2015.07); *D07B 7/18* (2013.01); *B29C 65/48* (2013.01); *B29C 65/4895* (2013.01); *B29C 66/43* (2013.01); *B29C 66/721* (2013.01); *B65H 2701/312* (2013.01); *B65H 2701/38* (2013.01); *Y10T 156/1052* (2015.01); *Y10T 428/2913* (2015.01)

(58) Field of Classification Search
USPC ...................................................... 57/22, 202
See application file for complete search history.

(56) References Cited

U.S. PATENT DOCUMENTS

| | | | |
|---|---|---|---|
| 3,882,090 A * | 5/1975 | Fagerburg | C08G 69/40 528/335 |
| 4,169,186 A | 9/1979 | Tazaki et al. | |
| 4,428,992 A * | 1/1984 | Street | 428/114 |
| 4,506,497 A * | 3/1985 | Feuerlohn | 57/22 |
| 4,546,880 A | 10/1985 | Reese | |
| 4,608,816 A * | 9/1986 | Bertrams et al. | 57/22 |
| 4,998,566 A * | 3/1991 | Akiyama | 139/35 |
| 5,052,172 A | 10/1991 | Matsui et al. | |
| 6,008,146 A * | 12/1999 | Stark | B01D 29/111 428/370 |
| 6,412,262 B2 * | 7/2002 | Ragnoli et al. | 57/22 |
| 8,505,271 B2 * | 8/2013 | Bowland et al. | 57/22 |
| 2003/0235688 A1 | 12/2003 | Mizukami et al. | |
| 2005/0279074 A1 * | 12/2005 | Johnson | H01B 13/0235 57/212 |
| 2010/0230040 A1 | 9/2010 | Tashiro et al. | |
| 2011/0027524 A1 * | 2/2011 | Bowland et al. | 428/114 |

FOREIGN PATENT DOCUMENTS

| | | |
|---|---|---|
| EP | 9-314558 A | 12/1997 |
| EP | 1 375 103 A1 | 1/2004 |
| JP | 6-114832 | 4/1994 |
| JP | 10-166362 | 6/1998 |
| JP | 2002-255448 | 9/2002 |
| JP | 2004-025482 | 1/2004 |
| JP | 2009083420 | 4/2009 |
| KR | 1983-0000729 | 5/1983 |
| WO | WO 2009/044641 A1 | 4/2009 |

OTHER PUBLICATIONS

Office Action from Korean Patent Office issued in corresponding Korean Application No. 10-2012-7008894, mailed Aug. 9, 2013, pp. 1-9.

International Search Report in the corresponding patent application PCT/JP2010/069750 mailed Dec. 21, 2010.

* cited by examiner

METHOD FOR CONNECTING REINFORCING FIBER BUNDLES, METHOD FOR PRODUCING LONG FIBER REINFORCED THERMOPLASTIC RESIN PELLET, AND WOUND BODY

TECHNICAL FIELD

The present invention relates to a method for connecting reinforcing fiber bundles serving as a material in a case where a long fiber reinforced thermoplastic resin pellet is produced or the like, a method for producing a long fiber reinforced thermoplastic resin pellet, for which this method for connecting is adopted, and a wound body.

BACKGROUND ART

In order to produce a long fiber reinforced thermoplastic resin pellet used as a material of injection molding or the like, the following method is known.

That is, a method includes: continuously pulling out reinforcing fiber bundles provided in a form that each reinforcing fiber bundle is wound around a bobbin, while making the reinforcing fiber bundles pass through an impregnation die, in which molten resin is stored; taking out the reinforcing fiber bundles from a die nozzle of this impregnation die as a long fiber reinforced resin strand, and then cooling down and twisting the long fiber reinforced resin strand, and then cutting off the long fiber reinforced resin strand by predetermined length into pellets (for example, refer to Patent Document 1).

The reinforcing fiber bundle is a bundle formed by gathering 2,000 to 3,000 long fibers (filaments) such as glass fiber, the bundle having an outer diameter of about 1 to 2 mm, and a shape of the bundle is retained by applying a sizing agent of polypropylene (PP) system or the like. It can be said that the sizing agent is required to maintain a gathered state in such a manner that unraveling of each long fiber is not generated and to generate flexibility like a strand.

Since a reinforcing fiber bundle is provided in the form that the reinforcing fiber bundle is wound around a bobbin (hereinafter, referred to as a wound body) as described above, each would body has a front end and a tail end. Therefore, at the time of continuously producing the long fiber reinforced thermoplastic resin pellet, every time when the wound body is replaced, there is a need for connecting a tail end of a reinforcing fiber bundle of a wound body finishing feeding of the reinforcing fiber bundle (hereinafter, also referred to as a "preceding wound body") and a front end of a reinforcing fiber bundle of a new wound body, in which the reinforcing fiber bundle is wound.

In order to connect the reinforcing fiber bundles, both the tail end and the front end are installed in an air splicer (a device for blowing pressurized air), the fiber bundles are unraveled to long fibers with the pressurized air, and the unraveled long fibers are entwined with each other.

CITATION LIST

Patent Document

Patent Document 1: Japanese Unexamined Patent Application Publication No. 2009-83420

SUMMARY OF THE INVENTION

Problems to be Solved by the Invention

As described above, the sizing agent is applied to the reinforcing fiber bundle. However, this sizing agent is in an emulsion state before application and originally contains water. Thus, after winding the reinforcing fiber bundle around the bobbin and forming the wound body, a drying operation that dries this entire wound body and removes extra water. However, when such a drying operation is performed, a state that water is evaporated from the outer peripheral surface side of the wound body is continued, and hence water moves (penetrates) from the center side of the wound body to the outer peripheral surface side.

At this time, although the sizing agent moves together with water, only water is evaporated from the outer peripheral surface side of the wound body. Thus, as a result, when drying is finished, a concentration phenomenon (migration), in which a concentration of the left sizing agent is increased, is generated on the outer peripheral surface side of the wound body.

For example, a wound body specified to have a content of the sizing agent of 0.6 wt % was measured. Here, although the reinforcing fiber bundle wound close to a center part of the wound body had the content of the sizing agent which was substantially the same as the above specification, the reinforcing fiber bundle wound close to an outer periphery of the wound body had 6 wt % or more of the content of the sizing agent in some cases.

Such a reinforcing fiber bundle having a high content of the sizing agent tends to have excessively small surface friction. In addition, even when pressurized air is blown to the reinforcing fiber bundle having a high content of the sizing agent with the air splicer, it is difficult for the reinforcing fiber bundle to be sufficiently unraveled. Naturally, connection strength (tensile strength) at the time of connecting by using the air splicer is easily weakened. Thus, in a case where the long fiber reinforced thermoplastic resin pellet is produced, there is a problem that a probability of breakage of a connection part of the reinforcing fiber bundles in the die nozzle of the impregnation die or the like or breakage of a corresponding part of the long fiber reinforced resin strand is increased, so that production efficiency is remarkably lowered.

The present invention is achieved in consideration of the above situation, and an object thereof is to provide a method for connecting reinforcing fiber bundles by which the reinforcing fiber bundles, serving as a material in a case where a long fiber reinforced thermoplastic resin pellet is produced or the like, are provided with required connection strength, so that interruption due to breakage can be prevented, and hence production efficiency of the long fiber reinforced thermoplastic resin pellet or the like can be enhanced.

In addition, another object of the present invention is to provide a method for producing a long fiber reinforced thermoplastic resin pellet, method in which the method for connecting the reinforcing fiber bundles is adopted.

Further, another object of the present invention is to provide a wound body capable of being connected by using an air splicer while connection strength (tensile strength) is not lowered.

Means for Solving the Problems

In order to achieve the above objects, the present invention takes the following measures.

That is, a method for connecting reinforcing fiber bundles according to the present invention, the method for connecting a tail end of a reinforcing fiber bundle of a preceding wound body and a front end of a reinforcing fiber bundle unwound from a new wound body by blowing pressurized air to both the ends so as to unravel and entwine both the reinforcing fiber bundles includes connecting both the reinforcing fiber bundles after a preparation step of adjusting an amount of a sizing agent contained in the front end of the reinforcing fiber bundle unwound from the new wound body and the tail end of the reinforcing fiber bundle of the preceding wound body to not less than 0 wt % and not more than 4 wt %.

In such a way, in a case where a long fiber reinforced thermoplastic resin pellet is produced or the like, a connection part of the reinforcing fiber bundles can be provided with required connection strength. Therefore, in a case where the long fiber reinforced thermoplastic resin pellet is produced or the like, interruption due to breakage of the reinforcing fiber bundles can be prevented, and hence production efficiency of the long fiber reinforced thermoplastic resin pellet or the like can be enhanced.

It should be noted that, when the amount of the sizing agent contained in the front end of the reinforcing fiber bundle unwound from the new wound body and the tail end of the preceding wound body exceeds 4 wt %, excessive slipping is easily caused between long fibers (filaments) in an unraveled state. In addition, when the amount of the sizing agent exceeds 4 wt %, the reinforcing fiber bundles are not easily unraveled and insufficiently entwined, and there is a fear that the required connection strength (tensile strength) is not obtained. Thus, according to the method for connecting of the present invention, in the preparation step, the sizing agent is reduced to not more than 4 wt %, and, in a case where the sizing agent is reduced to the least amount, the amount of the sizing agent is reduced until almost no sizing agent is detected.

As the preparation step, a method of removing the sizing agent by heating the front end of the reinforcing fiber bundle unwound from the wound body and/or the tail end of the reinforcing fiber bundle of the wound body, a method of applying or impregnating a solvent to the front end of the reinforcing fiber bundle unwound from the wound body and/or the tail end of the reinforcing fiber bundle of the wound body, a method of scraping the sizing agent on a surface of the fiber bundle by grinding the front end of the reinforcing fiber bundle unwound from the wound body and/or the tail end of the reinforcing fiber bundle of the wound body, or the like can be adopted.

Meanwhile, a method for producing a long fiber reinforced thermoplastic resin pellet according to the present invention includes: after a preparation step of adjusting an amount of a sizing agent contained in a tail end of a reinforcing fiber bundle of a preceding wound body and a front end of a reinforcing fiber bundle unwound from a new wound body to not less than 0 wt % and not more than 4 wt %, connecting the tail end of the reinforcing fiber bundle of the preceding wound body and the front end of the reinforcing fiber bundle unwound from the new wound body by blowing pressurized air to both the ends so as to unravel and entwine both the reinforcing fiber bundles; impregnating molten resin to the reinforcing fiber bundles while continuously pulling out the reinforcing fiber bundles so as to make the reinforcing fiber bundles into a long fiber reinforced resin strand; and making the long fiber reinforced resin strand into pellets.

Further, a wound body according to the present invention is a wound body formed by winding a reinforcing fiber bundle to which a sizing agent is applied, wherein a content of the sizing agent contained in both a front end and a tail end of the reinforcing fiber bundle is adjusted to not less than 0 wt % and not more than 4 wt %.

Effects of the Invention

With the method for connecting the reinforcing fiber bundles, the method for producing the long fiber reinforced thermoplastic resin pellet, and the wound body according to the present invention, the connection part of reinforcing fiber bundles is provided with the required connection strength in a case where the long fiber reinforced thermoplastic resin pellet is produced or the like, so that the interruption due to the breakage can be prevented, and hence the production efficiency of the long fiber reinforced thermoplastic resin pellet can be enhanced.

MODES FOR CARRYING OUT THE INVENTION

Hereinafter, an embodiment of the present invention will be described based on the drawings.

Figure 2:
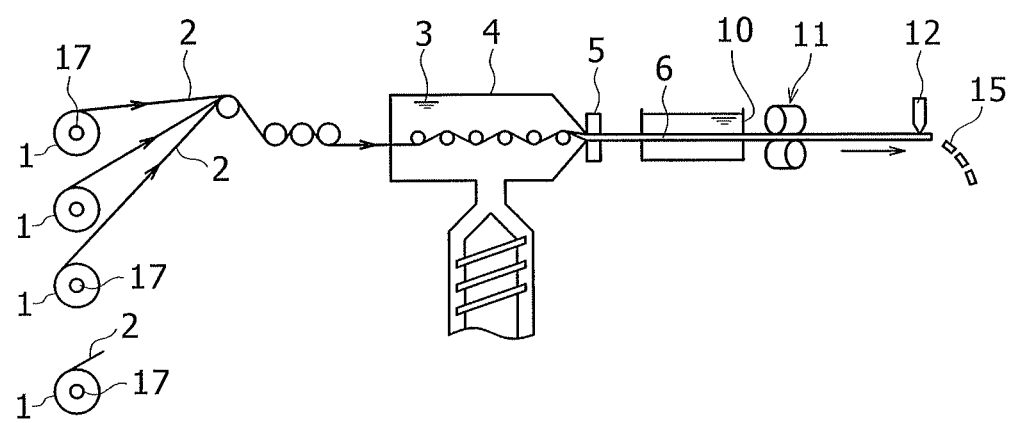
FIG. 2 A side view schematically showing production steps of a long fiber reinforced thermoplastic resin pellet.

FIG. 2 schematically shows production steps of long fiber reinforced thermoplastic resin pellets 15.

In these production steps, firstly, reinforcing fiber bundles 2 are continuously pulled out from one or a plurality of wound bodies 1 (three wound bodies in an example of the figure), and the reinforcing fiber bundles 2 pass through an impregnation die 4, in which molten resin 3 is stored. The reinforcing fiber bundles 2 impregnated with the melt resin 3 in this impregnation die 4 pass through a die nozzle 5 of the impregnation die 4, and are taken out as a long fiber reinforced resin strand 6 having a predetermined section diameter (thickness).

The long fiber reinforced resin strand 6 is then cooled down by passing through a water tank 10, twisted by a twisting roller device 11, and cut off into a predetermined length by a pelletizer 12. Thereby, long fiber reinforced thermoplastic resin pellets 15 are produced.

The wound body 1 is provided in a form that the reinforcing fiber bundle 2 is wound around a bobbin 17. The reinforcing fiber bundle 2 of the wound body 1 has a front end 2b at the time of starting unwinding from the wound body 1, and a tail end 2a at the time of finishing the unwinding (at the time of finishing consumption) (refer to FIG. 1). The front end 2b and the tail end 2a are parts respectively having length of about 300 mm to 2,000 mm from both ends of the reinforcing fiber bundle 2. This front end 2b is arranged on the inner peripheral side of the wound body 1, and the tail end 2a is arranged on the outer peripheral side.

At the time of continuously producing the long fiber reinforced thermoplastic resin pellet 15, there is a need for replacing the wound body 1 in which a remaining amount of the reinforcing fiber bundle 2 is small (almost consumed) with a new wound body 1. Thus, there is a need for connecting the tail end 2a of the reinforcing fiber bundle 2 of the preceding wound body and the front end 2b of the reinforcing fiber bundle 2 unwound from the inner peripheral side of the new wound body 1 over length of 300 mm to 2,000 mm, preferably length of 300 mm to 1,000 mm.

Figure 1:
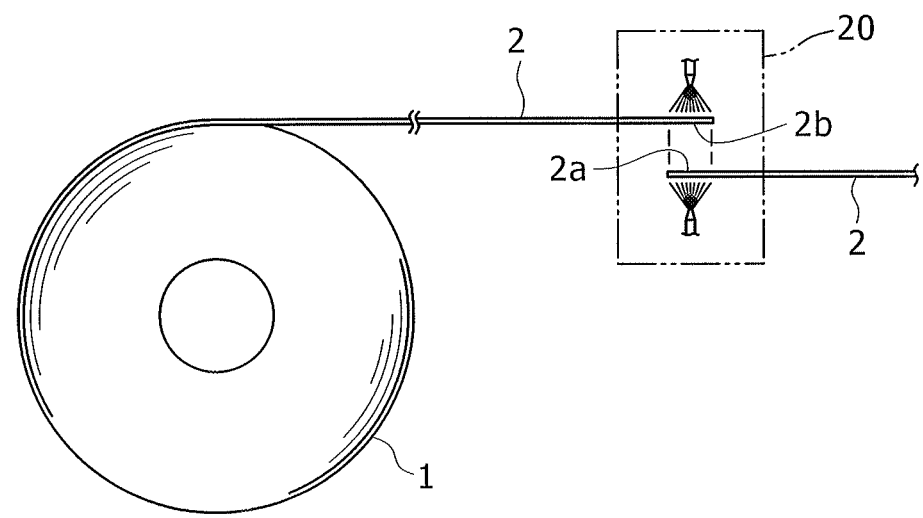
FIG. 1 A side view schematically showing a method for connecting reinforcing fiber bundles.

The tail end and the front end of the reinforcing fiber bundles 2 are connected as follows: as schematically shown in FIG. 1, the tail end 2a of the reinforcing fiber bundle 2 of the preceding wound body and the front end 2b of the reinforcing fiber bundle 2 unwound from the new wound body 1 are installed in an air splicer 20, for example, so that both the ends 2a and 2b are blown with pressurized air (for example, 6 kg/cm2) and the reinforcing fiber bundles 2 of both ends are unraveled, and then both ends are entwined with each other.

However, a sizing agent is applied to the reinforcing fiber bundles 2 as described later, and this sizing agent concentrates in the front end 2b of the reinforcing fiber bundle 2 unwound from the new wound body 1, and hence a content of the sizing agent becomes considerably high in the front end 2b. Even when the front end 2b having a high content of the sizing agent in such a way and the tail end 2a of the preceding wound body 1 are installed in the air splicer 20 and blown with pressurized air, the reinforcing fiber bundles 2 cannot be sufficiently unraveled. In addition, a reinforcing fiber bundle having a high content of the sizing agent has a lower surface friction. For such reasons, sufficient connection strength cannot be obtained in a part where the tail end 2a and the front end 2b are connected. Thus, when the long fiber reinforced resin strand 6 is taken out from the die nozzle 5 of the impregnation die 4, there is a possibility that the connected part between the reinforcing fiber bundles 2 is broken in the impregnation die 4 or a corresponding part of the long fiber reinforced resin strand 6 is broken on the downstream side of the die nozzle 5.

Therefore, according to the present invention, the reinforcing fiber bundle 2 of the wound body 1 is preliminarily subjected to a preparation step that adjusts an amount of the sizing agent to not less than 0 wt % and not more than 4 wt % for the front end 2b and the tail end 2a, lengths of which from respective ends of the reinforcing fiber bundle 2 are from 300 mm to 2,000 mm, preferably from 300 mm to 1,000 mm. This is because, by using the wound body 1 having a content of the sizing agent adjusted to not less than 0 wt % and not more than 4 wt % for both the front end 2b and the tail end 2a of the reinforcing fiber bundle 2 in such a way, the reinforcing fiber bundles can be connected with the air splicer while the connection strength (tensile strength) is not lowered.

Next, this sizing agent and the preparation step will be described.

The sizing agent contains an organic adhesive of, for example, polypropylene system, nylon system, acryl system, urethane system or the like, and is an emulsion formed by suspending this adhesive in water with a surface-active agent or the like. The sizing agent is applied to the pulled and aligned reinforcing fibers with a means such as impregnation and coating so as to bind the reinforcing fibers so that they are not unraveled.

The sizing agent immediately after application contains water, and cannot exert binding force to the reinforcing fibers without any treatment. Therefore, the sizing agent needs drying in order that it exerts the binding force to the reinforcing fibers. Here, after being wound as the wound body 1, the reinforcing fiber bundle to which the sizing agent is applied is subjected to a drying operation that dries the entire wound body 1.

In this drying operation, water is evaporated from the outer peripheral surface side of the wound body 1, and water moves (penetrates) from the center side of the wound body 1 to the outer peripheral surface side such that the water lost due to the evaporation is replaced with the moving water. At this time, the sizing agent moves together with water. However, only water is evaporated from the outer peripheral surface side of the wound body 1. Thus, only the sizing agent moving together with water is left, and hence the content of the sizing amount is increased. As a result, when the drying is finished, a concentration phenomenon (migration), in which a concentration of the left sizing agent is increased, is generated on the outer peripheral surface side of the wound body. In order to adjust the content of the sizing agent concentrated in such a way, the following preparation step is performed.

Figure 3:
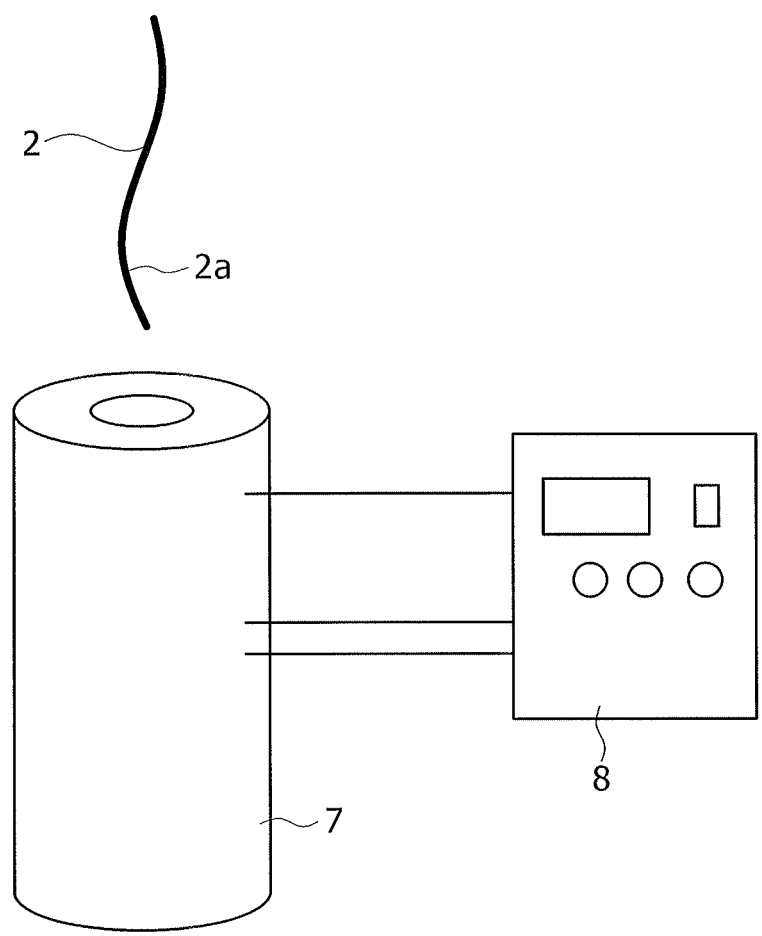
FIG. 3 A view schematically showing a preparation step in which a heating device is used.

As shown in FIG. 3, the preparation step is performed by heating the front end 2b of the reinforcing fiber bundle 2 unwound from the wound body 1 and the tail end 2a of the preceding wound body 1 with a heating device 7 (a mantle heater 7 in the present embodiment) so as to remove the sizing agent. The organic adhesive of polypropylene system or the like used in the sizing agent is thermally decomposed by heating. Thus, the extra adhesive can be removed only by heating, and hence the content of the sizing agent can be adjusted to not less than 0 wt % and not more than 4 wt %.

The mantle heater 7 is formed into a ring shape or a cylinder shape surrounding an object to be heated, so as to maintain the object to be heated at a fixed temperature or set predetermined temperature increase speed by using a controller 8. However, the heating device is not limited to the mantle heater, and a heating device incapable of adjusting a temperature can be used. For example, a heating device of heating by using a burner may be used.

In the first embodiment, a method of constantly heating an interior of the mantle heater 7 at a predetermined temperature (for example, 400° C.), and installing the tail end 2a and the front end 2b of the reinforcing fiber bundle 2 in this mantle heater 7 for 10 to 240 seconds is adopted.

A heating temperature and a heating time upon heating the front end 2b of the reinforcing fiber bundle 2 are already determined by performing the following experiment.

That is, a plurality of wound bodies 1 was prepared, front ends 2b of reinforcing fiber bundles 2 were unwound from those wound bodies, and these front ends 2b were installed and heated in the mantle heater 7 disposed in an air atmosphere.

Every time when a predetermined time elapses, one or a plurality of the reinforcing fiber bundles 2 were taken out from the mantle heater 7, and the content of the sizing agent and the connection strength were measured for each reinforcing fiber bundle 2.

It should be noted that the reinforcing fiber bundle 2 provided in any of the wound bodies 1 was a bundle of 2,000 to 3,000 glass fibers, the bundle having an outer diameter of about 1 to 2 mm and applied with a sizing agent of polypropylene. Any of the wound bodies was specified to have the content of the sizing agent of 0.6 wt %. However, as a result of measurement prior to heating, the content of the sizing agent in the front end 2b was approximately 6 wt %.

As the content of the sizing agent, a weight reduction amount measured with TGA (thermogravimetric analysis) was used. Thermo Plus [model number: TG8120] manufactured by RIGAKU was used as a measuring machine, and the content of the sizing agent was calculated from an amount of a substance detected at the time of heating from a room temperature to 800° C. at temperature increase speed of 10° C./min in an air atmosphere.

Upon the measurement of the connection strength, a tensile test machine [model number: 5582] manufactured by INSTRON was used, both the ends of the connection part were respectively fixed to chuck portions held at an interval of 300 mm between the chuck portions, only one of the chuck portions is moved so as to be away from the other chuck portion at test speed of 100 mm/min, and force generated at this time was regarded as the connection strength. It should be noted that the measurement of the connection strength was implemented three repetitive times under the same conditions, and a measurement result is indicated by an average value.

Table 1 shows a result of examining relationships between the heating time by the mantle heater, the connection strength of the reinforcing fiber bundles 2, the content of the sizing agent, and breakage/non-breakage of the reinforcing fiber bundles 2 at the time of producing the long fiber reinforced thermoplastic resin pellet 15.

TABLE 1

| Heating time (sec) | Tensile strength (N) | Breakage/ non-breakage of fiber at the time of producing | Amount of sizing agent (wt %) |
| --- | --- | --- | --- |
| 10 | 68.36 | Breakage | 5.31 |
| 40 | 45.97667 | Breakage | 4.33 |
| 80 | 82.10667 | Non-breakage | 3.89 |
| 120 | 100.96 | Non-breakage | 3.27 |
| 180 | 272.1733 | Non-breakage | 2.94 |

From this Table 1, it is found that, in order not to cause the breakage, 80 N or more is needed for the connection strength (tensile strength) of the reinforcing fiber bundles 2. It is also found that, in order to increase the connection strength of the reinforcing fiber bundles 2 to 80 N or more, it is necessary to decrease the amount of the sizing agent to 4 wt % or less. As a supplement, it is also found that, when the heating temperature is 400° C., the heating time is preferably longer than 40 seconds, and more preferably exceeds 80 seconds.

As a result of these, the heating temperature and the heating time at the time of heating the front end 2b and the tail end 2a of the reinforcing fiber bundles 2 are determined.

As clear from the above detailed description, when, in the preparation step performed before a connection operation, the content of the sizing agent is adjusted to not less than 0 wt % and not more than 4 wt % for the front end 2b of the reinforcing fiber bundle 2 unwound from the wound body 1, long fibers (filaments) in an unraveled state are strongly entwined with each other at the time of connecting this front end 2b and the tail end 2a of the reinforcing fiber bundle 2 of the preceding wound body after the adjustment, and thus, necessary and sufficient connection strength can be obtained.

Therefore, in a case where the long fiber reinforced thermoplastic resin pellet 15 is produced or the like, the connection part of the reinforcing fiber bundles 2 is not broken, so that interruption due to the breakage can be prevented. As a result, production efficiency of the long fiber reinforced thermoplastic resin pellet 15 can be enhanced.

It should be noted that the present invention is not limited to the above embodiment but can be appropriately changed in accordance with a mode.

For example, in addition to glass fiber, carbon fiber, nylon, aramid, or the like may be used as the long fibers of the reinforcing fiber bundles 2.

As the preparation step, there is a method of applying or impregnating a solvent such as acetone, for example, to the front end 2b of the reinforcing fiber bundle 2 unwound from the wound body 1, and dissolving the sizing agent into the solvent so as to make the amount of the sizing agent not more than 4 wt %. This preparation step using the solvent is particularly highly effective in a case where the organic adhesive contained in the sizing agent has a high melting point. In this case, in a case where the resin of PP system described above is used in the sizing agent, a nonpolar solvent other than acetone which is soluble relative to PP, such as a nonpolar solvent of, for example, MEK, benzene, toluene, or the like can be used as the solvent. In addition, since the conditions (the time, the concentration, and the like) for applying or impregnating the solvent and performing treatment are changed due to a type or a concentration of the resin used as the sizing agent, the conditions cannot be defined. However, in a case where the resin of PP system described above is used, the reinforcing fiber bundle 2 may be impregnated in acetone.

As another preparation step, there is a method of scraping the sizing agent on the surface of the fiber bundle by grinding the front end 2b of the reinforcing fiber bundle 2 unwound from the wound body 1. This is because the content of the sizing agent can be lowered even by wiping off the sizing agent with a waste cloth depending on the organic adhesive contained in the sizing agent. It should be noted that, in a case where the sizing agent firmly adheres to the reinforcing fiber bundle 2, the heating and removal of the sizing agent with the solvent, which are described above, may be performed in combination with the waste cloth, or a sandpaper having stronger force of scraping the sizing agent than the waste cloth or the like may be used.

The present invention is described in detail with reference to the particular embodiment. However, it is obvious to those skilled in the art that various modifications and corrections can be added without departing from the spirit and the scope of the present invention.

The present application is based on the Japanese patent application (Japanese Patent Application No. 2009-255045) filed on Nov. 6, 2009, and contents thereof are incorporated herein as a reference.

INDUSTRIAL APPLICABILITY

The present invention is useful for producing molding materials of various molded products made of fiber reinforced resin.

EXPLANATION OF REFERENCE NUMERALS

1: Wound body
2: Reinforcing fiber bundle
2a: Tail end
2b: Front end
3: Melt resin
4: Impregnation die
5: Die nozzle
6: Long fiber reinforced resin strand
7: Mantle heater
8: Controller
10: Water tank
11: Twisting roller device
12: Pelletizer
15: Long fiber reinforced thermoplastic resin pellet

The invention claimed is:
1. A method for connecting reinforcing fiber bundles, the method comprising the steps of:

applying a sizing agent which contains an organic adhesive and water to a reinforcing fiber bundle, winding the reinforcing fiber bundle to which the sizing agent is applied, thereby forming a first wound body, drying the entire first wound body, adjusting an amount of a sizing agent contained in a front end of the reinforcing fiber bundle unwound from the dried first wound body and a tail end of the reinforcing fiber bundle of a second wound body to not more than 4 wt %, and connecting both the tail end of the reinforcing fiber bundle of the second wound body and the front end of the reinforcing fiber bundle unwound from the first wound body by blowing pressurized air to both of the ends so as to unravel and entwine both of the reinforcing fiber bundles, wherein said step of adjusting includes removing the sizing agent by heating the front end of the reinforcing fiber bundle unwound from the first wound body and/or the tail end of the reinforcing fiber bundle of the second wound body at a temperature of 400° C. or higher for 80 seconds or more.

\* \* \* \* \*